US008559290B2

(12) United States Patent
Inoue et al.

(10) Patent No.: US 8,559,290 B2

(45) Date of Patent: Oct. 15, 2013

(54) OPTICAL INFORMATION RECORDING/REPRODUCING OPTICAL SYSTEM AND OPTICAL INFORMATION RECORDING/REPRODUCING APPARATUS

(75) Inventors: Satoshi Inoue, Saitama (JP); Yuta Yoshida, Saitama (JP); Naoto Hashimoto, Tochigi (JP); Suguru Takishima, Tokyo (JP)

(73) Assignee: Hoya Corporation, Tokyo (JP)

( * ) Notice: Subject to any disclaimer, the term of this patent is extended or adjusted under 35 U.S.C. 154(b) by 198 days.

(21) Appl. No.: 12/893,332

(22) Filed: Sep. 29, 2010

(65) Prior Publication Data

US 2011/0075541 A1 Mar. 31, 2011

(30) Foreign Application Priority Data

Sep. 30, 2009 (JP) ................................. 2009-225781
Jul. 29, 2010 (JP) ................................. 2010-169909

(51) Int. Cl.
*G11B 7/00* (2006.01)

(52) U.S. Cl.
USPC .................. 369/112.23; 369/112.24; 359/359

(58) Field of Classification Search
USPC ............. 369/112.01, 112.03, 112.23, 112.24, 369/112.16; 359/359, 580, 581
See application file for complete search history.

(56) References Cited

U.S. PATENT DOCUMENTS

| | | | | |
|---|---|---|---|---|
| 2003/0103271 | A1 * | 6/2003 | Ohta | 359/719 |
| 2005/0201422 | A1 | 9/2005 | Ohta et al. | |
| 2005/0219683 | A1 * | 10/2005 | Ohta et al. | 359/359 |
| 2005/0225879 | A1 | 10/2005 | Ohta et al. | |
| 2008/0049584 | A1 * | 2/2008 | Tan et al. | 369/112.16 |
| 2008/0198707 | A1 * | 8/2008 | Kim | 369/44.11 |
| 2008/0212452 | A1 * | 9/2008 | Hotta et al. | 369/112.23 |
| 2008/0259773 | A1 * | 10/2008 | Tada et al. | 369/112.23 |
| 2008/0316903 | A1 * | 12/2008 | Hotta et al. | 369/112.23 |
| 2010/0085633 | A1 * | 4/2010 | Takahashi et al. | 359/355 |

FOREIGN PATENT DOCUMENTS

| | | |
|---|---|---|
| JP | 2005-251354 | 9/2005 |
| JP | 2005-266780 | 9/2005 |
| JP | 2005-302088 | 10/2005 |
| JP | 2008-217886 | 9/2008 |

OTHER PUBLICATIONS

U.S. Appl. No. 12/893,268 to Satoshi Inoue et al., which was filed Sep. 29, 2010.

U.S. Appl. No. 12/893,382 to Satoshi Inoue et al., which was filed ep. 29, 2010.

* cited by examiner

*Primary Examiner* — Thomas Alunkal

(74) *Attorney, Agent, or Firm* — Greenblum & Bernstein, P.L.C.

(57) ABSTRACT

An optical information recording/reproducing optical system where resin material has Tg>115° C., first, second and third films are on an optical disc side of an objective lens and surfaces of an optical element, respectively, a light source side of the objective lens has a fourth film having four or more layers not containing Ti, each of the first, second and third films includes a non-high refractive index layer made of one of silicon oxide, aluminum oxide, aluminum fluoride and magnesium fluoride or a mixture of at least two of them, each of the first, second and third films is not made of one of Ti, Ta, Hf, Zr, Nb, Mo and Cr, a layer of the fourth film closest to a base material is the non-high refractive index layer. The fourth film satisfies $350<\lambda_{max(2)}<420$ and $600<\lambda_{min(2)}<750$, and reflectivity thereof decreases monotonously.

20 Claims, 4 Drawing Sheets

D0
42(SURFACE D)
(SURFACE C) 41
4
AX
100
32(SURFACE B)
3
31
(SURFACE A)
1
2
5

OPTICAL INFORMATION RECORDING/REPRODUCING OPTICAL SYSTEM AND OPTICAL INFORMATION RECORDING/REPRODUCING APPARATUS

BACKGROUND OF THE INVENTION

The present invention relates to an optical information recording/reproducing optical system and an optical information recording/reproducing apparatus for recording information to and/or reproducing information from an optical disc based on a predetermined standard by irradiating an information recording layer of the optical disc with a laser beam, and particularly to an optical information recording/reproducing optical system and an optical information recording/reproducing apparatus suitable for information recording/reproducing for a high-recording density optical disc, such as BD (Blu-ray Disc).

There exist various standards of optical discs, such as CD (Compact Disc) and DVD (Digital Versatile Disc), differing in recording density, protective layer thickness, etc. Meanwhile, high-recording density optical discs (e.g., BD), having still higher recording density than DVD, are being brought into practical use in recent years to realize still higher information storage capacity. Incidentally, in this specification, the "optical information recording/reproducing apparatuses" include apparatuses for both information reproducing and information recording, apparatuses exclusively for information reproducing, and apparatuses exclusively for information recording, and the same thing can be said for the "optical information recording/reproducing optical systems". In the following, the "optical information recording/reproducing optical system" is frequently referred to as an optical system of an optical pick-up.

When information recording or information reproducing for an optical disc is executed in the optical information recording/reproducing apparatus, undesired reflected light or scattered light, which are generated on optical surfaces of optical elements (e.g., an objective lens and a collimator lens configuring an optical system of an optical pick-up) may interfere with signal light, and thereby deteriorate the quality of the signal light which is used for information recording or information reproducing. For this reason, in many cases, a functional film, such as an antireflection film or an antistatic film for preventing adhesion of dust to an optical surface, is provided on an optical surface of an optical element (e.g., an objective lens) configuring an optical system of an optical pick-up.

Incidentally, in order to execute information recording or information reproducing for a high-recording density optical disc, such as BD, it is required to converge a laser beam to have a small beam spot diameter on the recording layer of the optical disc. For this reason, a laser beam having a short wavelength, for example, around 400 nm (hereafter, referred to as "blue laser light") is used, and an objective lens having a larger numerical aperture (e.g., 0.85 for BD) and having a short focal length is used. Since a lens surface of an objective lens of this type has a small curvature radius, an incident angle of the laser beam on the lens surface of the objective lens becomes larger at a point closer to the periphery of the objective lens, and therefore the reflectivity of the lens surface becomes larger at a point closer to the periphery of the objective lens. As a result, a problem arises that the rim intensity (a ratio of the intensity of light passing through a peripheral part of an objective lens to the intensity of light passing through a central part close to an optical axis of the objective lens) of the laser beam which has passed through the objective lens decreases, and thereby the periphery of the beam spot converged on the recording layer is blurred and the entire power of the beam spot also decreases.

Japanese Patent Provisional Publication No. 2008-217886A (hereafter, referred to as JP2008-217886A) discloses a technique for decreasing the beam spot diameter on the recording layer of the optical disc by providing an antireflection film on an entrance surface of an objective lens having a small curvature radius. Specifically, the antireflection film has a low transmissivity in the central portion of the objective lens and has a high transmissivity in the peripheral part of the objective lens.

Since the blue laser beam used for information recording or the information reproducing for the high-recording density optical disc has high energy, the blue laser beam tends to chemically affect the base material of an optical element and thereby alter the quality of the base material of the optical element. Therefore, if a resin lens with a coating is irradiated with the blue laser beam having a power density larger than or equal to a certain level for a long time, minute change in shape occurs on the optical surface of the resin lens, and thereby the optical performance (e.g., aberrations or the optical efficiency) of the resin lens deteriorates. Japanese Patent Provisional Publication No. 2005-251354A (hereafter, referred to as JP2005-251354A) suggests changing the resin base material of an optical element, as a measure against the above described problem.

However, it is difficult to control the reflectivity distribution of an antireflection film with a high degree of positional accuracy, particularly on an optical surface having a complicated three-dimensional shape, such as an optical surface of an objective lens. Therefore, realizing the antireflection film disclosed in JP2008-217886A on an optical surface having a complicated three-dimensional shape with currently available processing technology is difficult. Furthermore, it is difficult to achieve the transmissivity distribution suggested in JP2008-217886A without using coating material which tends to cause the change in shape on the base material of an optical element when the optical element is irradiated with the blue laser beam.

More specifically, in JP2005-251354A, a technique in which resin having an alicyclic structure is used as the resin base material to prevent decreasing of the degree of adhesiveness with respect to a functional film is suggested. However, it should be noted that the resin material is one of most important optical design parameters defining the optical performance of the optical element (i.e., the optical performance of an optical system of an optical pick-up). Therefore, it is not desirable to limit a selection range of resin materials. That is because the degree of design freedom reduces. In actuality, an optical configuration suggested in JP2005-251354A is not able to realize the optical performance required for an optical system of an optical pick-up for BD. In addition, the optical configuration suggested in JP2005-251354A is not able to achieve a sufficient light-resisting property although the configuration is able to extend, to a certain extent, the time that elapses before the change in shape occurs on the coated surface of the optical element.

SUMMARY OF THE INVENTION

The present invention is advantageous in that it provides an optical information recording/reproducing optical system and an optical information recording/reproducing apparatus configured to compensate for decrease of the rim intensity and to form a beam spot having a suitably small diameter on a recording layer of an optical disc while securing a sufficient light-resisting property in a high temperature environment.

According to an aspect of the invention, there is provided an optical information recording/reproducing optical system for recording information to and/or reproducing information from an optical disc by letting a laser beam impinge on a recording layer of the optical disc. The optical information recording/reproducing optical system is provided with a light source that emits the laser beam, an optical element that converts the laser beam emitted by the light source into a substantially collimated beam, and an objective lens that converges the laser beam emerging from the optical element onto the recording layer of the optical disc. In this configuration, a wavelength λ (unit: nm) of the laser beam falls within a range defined by a following condition:

$$390<\lambda<420 \quad (1).$$

The optical element and the objective lens are made of same resin materials or different resin materials having a glass transition temperature Tg satisfying a condition:

$$Tg>115° C. \quad (2).$$

A first multilayer functional film, a second multilayer functional film and a third multilayer functional film are formed on an optical disc side optical surface of the objective lens, a light source side optical surface of the optical element, and an optical disc side optical surface of the optical element, respectively. A light source side optical surface of the objective lens opposite to the optical disc side optical surface of the objective lens is provided with a fourth multilayer functional film having four or more layers. The fourth multilayer functional film does not contain titanium (Ti). Each of the first, second and third multilayer functional films includes a non-high refractive index layer made of a composition containing one of silicon oxide, aluminum oxide, aluminum fluoride and magnesium fluoride or a mixture of at least two of silicon oxide, aluminum oxide, aluminum fluoride and magnesium fluoride. Each of the first, second and third multilayer films does not have a layer containing a composition made of at least one of elements of titanium (Ti), tantalum (Ta), hafnium (Hf), zirconium (Zr), niobium (Nb), molybdenum (Mo) and chromium (Cr). A layer of the fourth multilayer functional film closest to a base material is formed to be the non-high refractive index layer. The fourth multilayer functional film is configured such that a wavelength $\lambda_{max(2)}$ at which reflectivity at vertical incidence of the fourth multilayer film takes a maximum value and a wavelength $\lambda_{min(2)}$ at which reflectivity at vertical incidence of the fourth multilayer film takes a minimum value respectively satisfy following conditions (3) and (4):

$$350<\lambda_{max(2)}<420 \quad (3), \text{ and}$$

$$600<\lambda_{min(2)}<750 \quad (4).$$

The fourth multilayer functional film is configured such that the reflectivity of the fourth multilayer functional film at vertical incidence decreases monotonously from the wavelength $\lambda_{max(2)}$ to the wavelength $\lambda_{min(2)}$.

The wavelength at which the reflectivity takes a minimum value shifts toward a shorter wavelength side as the incident angle of the laser bean incident on the functional film increases. Therefore, by satisfying the condition (3), it becomes possible to increase the reflectivity in the central portion of the laser beam. By satisfying the condition (4), it becomes possible to decrease the reflectivity in the peripheral part of the laser beam where the incident angle is large, and thereby it becomes possible to increase the rim intensity. If the condition (3) is not satisfied, the reflectivity in the central part of the laser beam is low, and therefore it is impossible to enhance the rim intensity. As a result, a problem arises that the property of the functional film varies depending on variations of the thickness of the film. If the condition (4) is not satisfied, it becomes impossible to lower the reflectivity in the peripheral part where the incident angle is relatively large, and therefore it becomes impossible to improve the rim intensity.

Furthermore, if the reflectivity of the fourth multilayer film at vertical incidence does not monotonously decrease from the wavelength $\lambda_{max(2)}$ to the wavelength $\lambda_{min(2)}$, the shape of the beam spot is badly affected because in this case the transmissivity does not change smoothly and monotonously with respect to the incident angle.

According to the above described configuration, an optical system of an optical pick-up, which has an excellent light-resisting property and is able to lower the rim intensity and to lower the jitter level, while securing required optical performance as an optical system for a high-recording density optical disc, is provided.

In at least one aspect, the fourth multilayer film may include a high refractive index layer containing a composition made of at least one of tantalum (Ta), hafnium (Hf), zirconium (Zr), niobium (Nb), molybdenum (Mo) and chromium (Cr) or a mixture of at least two of the tantalum (Ta), hafnium (Hf), zirconium (Zr), niobium (Nb), molybdenum (Mo) and chromium (Cr).

The energy density of the laser beam on the light source side surface of the objective lens is smaller than that on the optical disc side surface of the objective lens. Therefore, regarding the fourth multilayer functional film, it is possible to use the high refractive index layer containing the above described composition as long as a non-high refractive index layer is provided between the high refractive index layer and the base material. By providing a high-refractive index layer for a functional film, it becomes possible to set the optical performance of the functional film in a wide range.

In at least one aspect, the reflectivity at vertical incidence of the first multilayer film formed on the optical disc side surface of the objective lens may take a value larger than or equal to 10% within a wavelength range of 350 to 450 nm.

When the reflecting property of the optical disc side surface of the objective lens satisfies such a condition, the rim intensity can be further enhanced.

In at least one aspect, the optical information recording/reproducing optical system may further include a diffraction grating which divides the laser beam from the light source into a plurality of diffracted light beams, the diffraction grating being located between the light source and the optical element.

In at least one aspect, the first multilayer film formed on the optical disc side surface of the objective lens may be configured such that a wavelength $\lambda_{min(1)}$ at which reflectivity at vertical incidence of the first multilayer film takes a minimum value satisfies a condition:

$$430<\lambda_{min(1)}<600 \quad (5).$$

The wavelength at which the reflectivity takes a minimum value shifts toward a shorter wavelength side as the incident angle of the laser beam incident on the functional film increases. Therefore, if the wavelength $\lambda_{min(1)}$ gets lower than the lower limit of the condition (5), the transmissivity in the peripheral part of the beam largely decreases relative to the central part on which the laser beam incident on the film perpendicularly, and therefore it becomes impossible to enhance the rim intensity. If the wavelength $\lambda_{min(1)}$ gets higher than the upper limit of the condition (5), the total transmissibility decreases excessively.

In at least one aspect, the first multilayer film may be a three layer film formed by stacking, on a base material, first to third layers in this order from a base material side. In this case, when n1 to n3 respectively represent refractive indexes of the first to third layers at a wavelength of 406 nm and d1 to d3 (unit: nm) respectively represent thicknesses of the first to third layers, the refractive indexes n1 to n3 and the thicknesses d1 to d3 satisfy conditions:

First Layer: $n1 \leq 1.55$, $40 \leq d1 \leq 100$

Second Layer: $1.55 < n2 \leq 1.70$, $40 \leq d2 \leq 150$

Third Layer: $n3 \leq 1.55$, $40 \leq d3 \leq 100$.

By thus forming the functional film by a layer having a relatively low refractive index which is close to the refractive index of the base material, it becomes possible to prevent the power of the laser light from localizing in the functional film and thereby it becomes possible to provide the optical surface having the suitable light-resisting property. Furthermore, by setting the refractive indexes and the thicknesses of the layers within the above described ranges, it becomes possible to decrease the reflectivity with respect to the light ray having the design reference wavelength and being incident perpendicularly on the optical surface, which is advantageous in securing an adequate amount of light.

In at least one aspect, the fourth multilayer film may be a four layer film formed by stacking, on the base material, fourth to seventh layers in this order from a base material side. In this case, when n4 to n7 respectively represent refractive indexes of the fourth to seventh layers at a wavelength of 406 nm and d4 to d7 (unit: nm) respectively represent thicknesses of the fourth to seventh layers, the refractive indexes n4 to n7 and the thicknesses d4 to d7 satisfy conditions:

Fourth Layer: $n4 \leq 1.55$, $10 \leq d4 \leq 100$

Fifth Layer: $1.55 < n5 \leq 1.70$, $20 \leq d5 \leq 50$

Sixth Layer: $1.80 \leq n6$, $40 \leq d6 \leq 100$

Seventh Layer $n7 \leq 1.55$, $100 \leq d7 \leq 200$.

With the above described configuration, a certain interval can be secured between the base material and the high refractive index layer. As a result, the base material can be brought to the state of not directly affected by the high refractive index layer chemically or thermally, and therefore the light resisting property of the optical surface can be enhanced. By providing a plurality of layers not containing the transition element between the base material and the high refractive index layer, it becomes possible to secure an interval between the base material and the high refractive index layer. Furthermore, by setting the refractive indexes and thicknesses of the layers of the functional film within the above described ranges, the transmissivity in the central region of the laser beam close to the optical axis becomes low and the transmissivity in the peripheral region of the laser beam becomes high. As a result, the rim intensity can be improved. Furthermore, the jitter level can be decreased.

In at least one aspect, the fourth multilayer film may be a four layer film formed by stacking, on the base material, fourth to seventh layers in this order from a base material side. In this case, when n4 to n7 respectively represent refractive indexes of the fourth to seventh layers at a wavelength of 406 nm and d4 to d7 (unit: nm) respectively represent thicknesses of the fourth to seventh layers, the refractive indexes n4 to n7 and the thicknesses d4 to d7 satisfy conditions:

Fourth Layer: $n4 \leq 1.55$, $20 \leq d4 \leq 150$

Fifth Layer: $1.55 < n5 \leq 1.70$, $30 \leq d5 \leq 100$

Sixth Layer: $n6 \leq 1.55$, $30 \leq d6 \leq 100$

Seventh Layer $1.55 < n7 \leq 1.70$, $30 \leq d7 \leq 100$.

By setting the refractive indexes and the thicknesses of the layer of the functional film within the above described ranges, the transmissivity in the central region of the laser beam close to the optical axis becomes low, and the transmissivity in the peripheral region of the laser beam becomes high, and therefore the rim intensity can be improved.

According to another aspect of the invention, there is provided an optical information recording/reproducing apparatus for recording information to and/or reproducing information from an optical disc by letting a laser beam impinge on a recording layer of the optical disc. The optical information recording/reproducing apparatus is provided with the above described optical information recording/reproducing optical system.

With the configuration, an optical information recording/reproducing apparatus, which has an excellent light-resisting property and is able to lower the rim intensity and to lower the jitter level, while securing required optical performance as an optical system for a high-recording density optical disc, can be provided.

BRIEF DESCRIPTION OF THE ACCOMPANYING DRAWINGS

DETAILED DESCRIPTION OF THE EMBODIMENTS

Hereinafter, an embodiment according to the invention are described with reference to the accompanying drawings.

Figure 1:
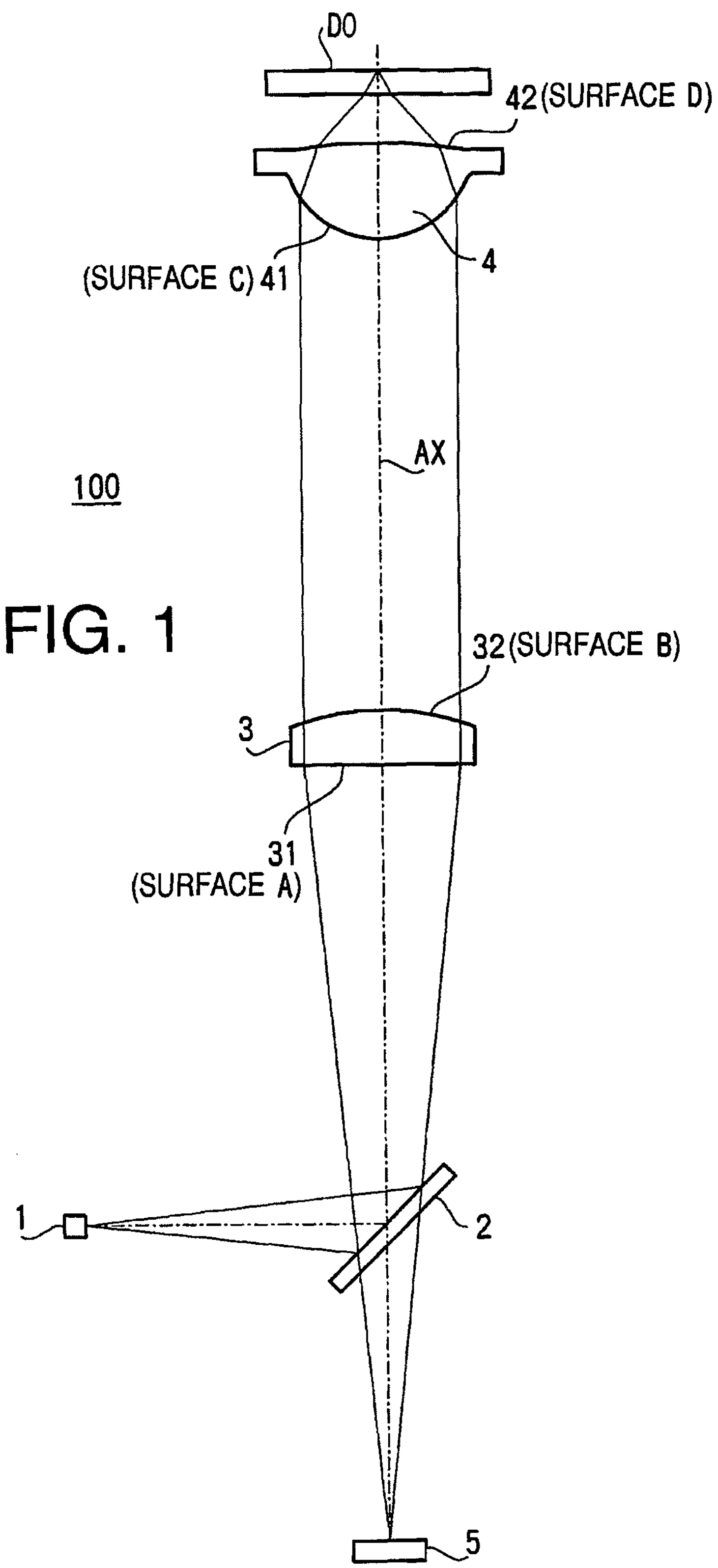
FIG. 1 is a block diagram generally illustrating a configuration of an optical system of an optical pick-up to be mounted on an optical information recording/reproducing apparatus according to an embodiment of the invention.
Figure 2A:
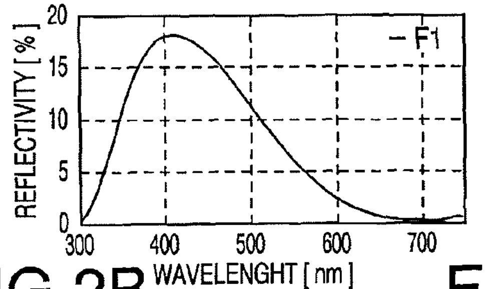
FIGS. 2A to 2J are graphs respectively illustrating the reflection spectrums of functional films F1 to F10 according to the embodiment.
Figure 2B:
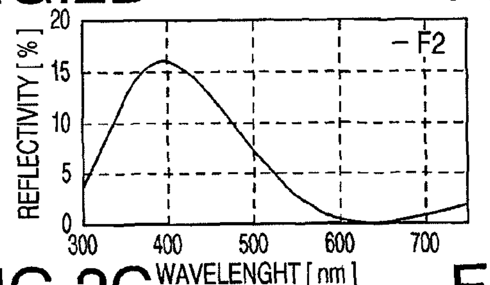
Figure 2C:
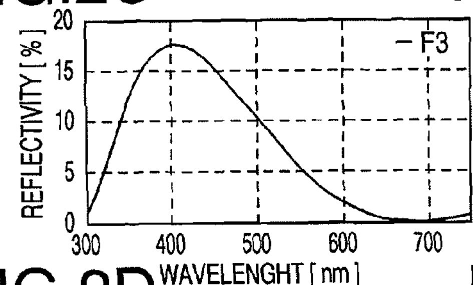
Figure 2D:
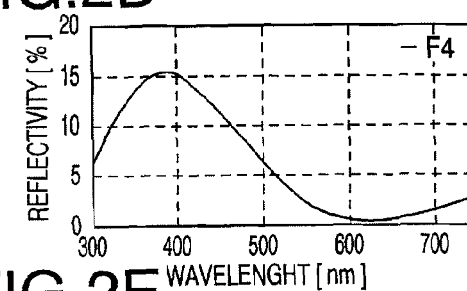
Figure 2E:
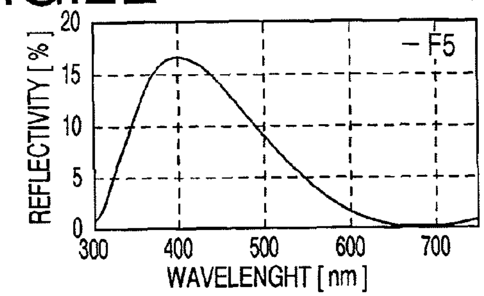
Figure 2F:
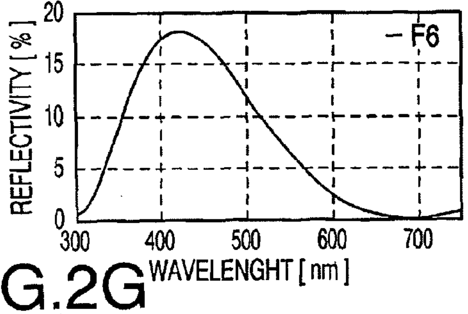
Figure 2G:
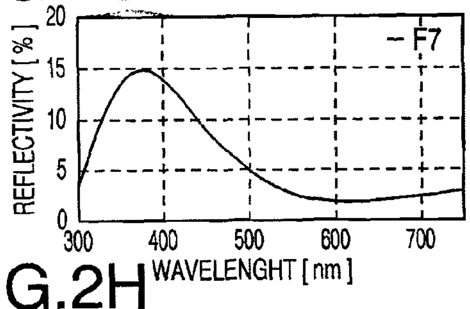
Figure 2H:
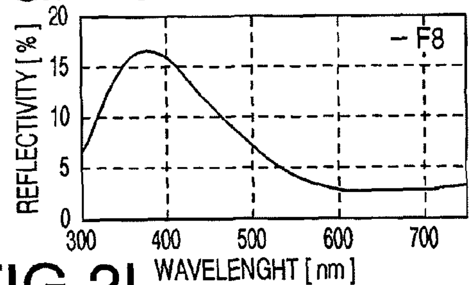
Figure 2I:
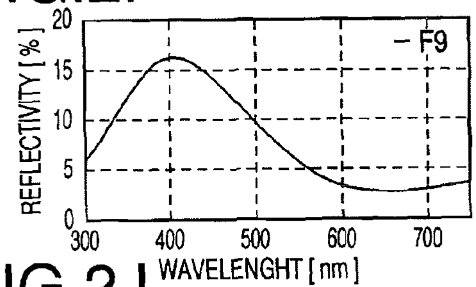
Figure 2J:
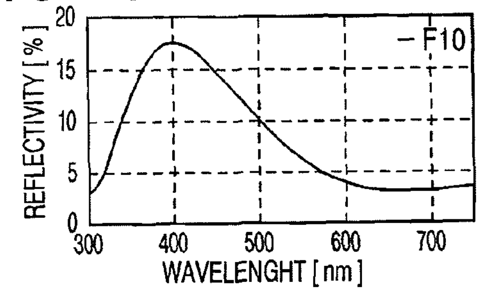

FIG. 1 is a block diagram generally illustrating a configuration of an optical system of an optical pick-up 100 to be mounted on an optical information recording/reproducing apparatus according to the embodiment of the invention. The optical information recording/reproducing apparatus according to the embodiment is configured to record information to and/or reproduce information from a high-density optical disc (hereafter, simply referred to as an "optical disc D0") complying with a BD standard.

As shown in FIG. 1, the optical system of an optical pick-up 100 includes a light source 1, a half mirror 2, a collimator lens 3, an objective lens 4 and a photoreceptor 5. In FIG. 1, a chain line indicates a reference axis AX of the optical system of an optical pick-up 100, and a thin solid line indicates a light beam proceeding to the optical disc D0 and a returning light beam from the optical disc D0. In the following explanation, an light source side optical surface of the collimator lens 3 is referred to as a surface A (31), an objective lens side surface of the collimator lens 3 is referred to as a surface B (32), an optical surface of the objective lens 3 to which the laser beam emerging from the surface B (32) enters is referred to as a surface C (41), and an optical surface of the objective lens through which the laser beam exits is referred to as a surface D (42).

The optical disc D0 has a protective layer and a recording layer (not shown). In actuality, in the optical disc D0, the recording layer is sandwiched by the protective layer and a substrate layer (or a label layer). The information recording or information reproducing is executed by letting the laser beam from the light source 1 enter the recording layer of the optical disc D0 in a state where the optical disc D0 is placed on a turn table (not shown).

The light source 1 is a semiconductor laser which emits blue laser light having a design wavelength of 406 nm. In general, an oscillation wavelength λ (unit: nm) of Fabry-Perot type semiconductor laser used for an optical system of an optical pick-up fluctuates within a range of several nm to several tens of nm (e.g., 400-410 nm) depending on individual differences and use environments of the semiconductor lasers.

As shown in FIG. 1, the laser beam emitted from the light source 1 is deflected by the half mirror 2 to be incident on the surface A (31) of the collimator lens 3. The laser beam which has entered the collimator 3 is then converted into to a collimated beam, and is incident on the surface C (41) of the objective lens 4 after exiting from the collimator lens 3 through the surface B (32). The laser beam is converged by the objective lens 4 in the vicinity of the recording layer of the optical disc D0 to form a suitable beam spot with a small amount of aberration on the recording layer of the optical disc D0. The laser beam reflects from the recording layer of the optical disc D0, and returns along the same optical path along which the laser beam proceeds to the optical disc D0. Then, the returning laser beam is received by the photoreceptor 5 through the half mirror 2.

The photoreceptor 5 executes photoelectric conversion for the received laser beam to generate an analog signal, and outputs the analog signal to a signal processing circuit (not shown). The signal processing circuit executes an error correction process while converting the analog signal into a bit stream. Then, the signal processing circuit separates streams (e.g., an audio stream and a video stream) from the bit stream for which the error correction has been executed, and decodes each separated stream. Then, the signal processing circuit converts an audio signal and a video signal which have been obtained by decoding, into analog signals to be output through a speaker and a display (not shown), respectively. Thus, audio and video recorded in the optical disc D0 are reproduced through the speaker and the display.

The objective lens 4 is configured such that a numerical aperture thereof on the optical disc side at the wavelength λ falls, for example, within a range from 0.8 to 0.87 so that the information recording and information reproducing can be suitably executed.

Each of the collimator lens 3 and the objective lens 4 is a resin lens made of synthetic resin by molding. Since a resin lens is lighter in weight than a glass lens, it is possible to reduce a load to be placed on an actuator for driving a lens (not shown) by employing a resin lens. Furthermore, a resin lens has a glass transition temperature which is considerably lower than that of a glass lens. Therefore, a resin lens can be molded in a lower temperature condition and can be manufactured more easily than a glass lens. Consequently, the amount of energy consumption for manufacturing of a resin lens is lower than that of a glass lens. Furthermore, a resin lens hardly becomes cracked and can be handled easily. Therefore, resin lenses are suitable for cost reduction by mass production.

As material of each of the collimator lens 3 and the objective lens 4, resin having a refractive index n of 1.4 to 1.7 at the wavelength λ is selected. As described below, when an optical surface of an optical element (e.g., the collimator lens 3 or the objective lens 4) is coated with a functional film, a minute change in shape may be caused by a photocatalytic reaction on the coated optical surface if the blue laser beam passes through the optical system of an optical pick-up 100 in a high temperature environment. Such a change in shape on the optical surface frequently occurs when the glass transition temperature Tg of the resin forming the collimator lens 3 or the objective lens 4 is relatively low (e.g., when Tg is lower than or equal to 115° C.). For this reason, as base materials of the collimator lens 3 and the objective lens 4, resin having the glass transition temperature Tg higher than 115° C. (preferably, higher than 120° C.) is employed. It should be noted that the base material of the collimator lens 3 and the base material of the objective lens 4 may be the same type of resin or may be different types of resins.

In the optical system of an optical pick-up 100, the position of the collimator lens 3 along the optical axis may be adjusted to correct the spherical aberration that would occur due to, for example, difference in thickness of the cover layer of the optical disc, the difference in wavelength or the temperature variations. It should be noted that, in the case where the collimator lens 3 is shifted from the state shown in FIG. 2 to correct the spherical aberration, the collimator lens 3 may be expressed as an optical element that converts the laser beam emitted by the light source 1 into a substantially collimated beam.

Both surfaces of each of the collimator lens 3 and the objective lens 4 are coated with functional films. These functional film has a function as an antireflection film for preventing occurrence of reflection of the laser beam incident on an optical surface and/or a function as a reflection type wavelength filter (i.e., a transmissivity adjustment film) for suppressing transmission of the short wavelength component (e.g., 350-400 nm) which would deteriorate a coated optical surface. By providing the functional film on each of the optical surfaces of the collimator lens 3, the amount of loss of light having a wavelength close to a reference wavelength can be decreased. As a result, it becomes possible to secure a required amount of light. The functional film formed on the surface C (41) of the objective lens 4 is additionally provided with a function of improving the rim intensity.

Incidentally, regarding deterioration of optical performance of a resin optical element on which a functional film is formed, caused when an optical surface of the optical element is irradiated with blue laser light having a strong intensity in a high temperature environment, a mechanism of the deterioration has not been sufficiently clarified yet. The present invention has been made based on a hypothetical theory about the mechanism of deterioration of the optical performance of the resin optical element explained by the inventors of the present invention through various experiments and analysis. Therefore, before explaining embodiments of the invention, findings and a hypothetical theory attained by the inventors regarding the mechanism of deterioration of optical performance (e.g., aberrations) are explained below.

As described above, when an optical surface formed by coating a resin base material with a dielectric thin film, such as an antireflection film, is irradiated with laser light having an intensity larger than or equal to a certain level and having a short wavelength around 400 nm for a relatively long time in a high temperature condition, minute change in shape or alteration occurs on the optical surface, and thereby the aberration or the light amount of the laser beam to be received varies. Such a change in shape or alteration occurs at a temperature higher than or equal to 60° C., and frequently occurs on the optical surface on which a high refractive index film made of a compound containing a transition element such as titanium is formed.

The change in shape and the alteration frequently occurs when the material of the thin film contains a transition element, such as titanium (Ti), tantalum (Ta), hafnium (Hf), zirconium (Zr), niobium (Nb), molybdenum (Mo) or chromium (Cr) which composes a compound having the photocatalysis. In particular, frequency of occurrence of the change in shape and the alteration increases remarkably when the thin film containing titanium oxide is formed on the optical surface. In a high temperature environment, the photocatalysis of the functional film is activated, and a chemical reaction is caused in the resin of the base material around the functional film. As a result, decomposition or alteration is caused in the resin of the base material. It is considered that the optical performance deteriorates due to a resultant change in shape of the optical surface and a resultant change of the refractive index or the absorption.

When we observe the optical surface of the optical element whose optical performance (e.g., aberrations) has been deteriorated by irradiation of blue laser, we frequently find minute bumps and dips on the optical surface. The bumps and dips formed on the optical surface correspond to a profile of the intensity distribution of the laser beam with which the optical surface is irradiated. For example, in an optical system where a diffraction grating is placed on an optical path, bumps and dips corresponding to a striped intensity distribution pattern generated by the diffraction grating may appear on each lens surface in the optical system. Regarding a lens having ring-shaped steps on one surface of the lens, concentric bumps and dips matching with shadows of the ring-shaped steps are formed on the other surface of the lens. If an optical surface is irradiated with a blue laser beam having a profile of an elliptical intensity distribution, an elliptical depression may appear on the optical surface, and thereby deterioration of the optical performance is caused such that astigmatism varies in the longer axis direction of the elliptical shape. It is considered that the bumps and dips (depression) are caused by contraction of a part of the base material where alteration and decomposition have been caused by the photocatalysis of the functional film. From a correlation between the minute change in shape of the optical surface and the deterioration of the optical performance, it is considered that one of direct factors for causing the deterioration of the optical performance is the minute change in shape of the optical surface. If the laser beam has a certain intensity distribution, the optical performance (e.g., aberrations) also varies depending on change in refractive index due to the decomposition and alteration of the resin of the base material, caused by the intensity distribution of the laser beam.

The inventors of the present invention have found that if a functional film consisting of silicon oxide, aluminum oxide, aluminum fluoride, magnesium fluoride or a mixture of at least two of the these materials is formed on an optical surface, change of the optical performance due to the minute change in shape of the optical surface or the alteration of the base material (which would be caused when the optical surface is irradiated with the blue laser beam) becomes hard to occur. Furthermore, the inventors have found that even when an optical surface has a thin layer made of a high refractive index compound containing transition metal having the photocatalysis, such as tantalum oxide, the change in shape of the optical surface becomes hard to occur if a layer of material such as silicon oxide intervenes between the resin base material and the thin layer made of the high refractive index compound. The compound such as silicon oxide does not have the photocatalysis. Therefore, it is considered that the minute change in shape does not occur on the optical surface on which a functional film made of the composition such as silicon oxide is provided. Furthermore, it is considered that, even when the functional film has a thin layer containing a transition element such as tantalum oxide, the base material is not directly affected by the photocatalysis of the thin layer containing the transition element if a thin layer of material such as silicon oxide intervenes between the thin layer containing the transition element such as tantalum oxide and the base material, and therefore the change in shape becomes hard to occur. It should be noted that titanium provides a compound having particularly strong photocatalysis. Therefore, when a thin layer containing titanium is provided in a functional film, it is required to considerably increase the thickness of a thin layer of material such as silicon oxide arranged between the base material and the thin layer containing the titanium so that change of the optical performance can be suppressed effectively. However, to considerably increase the thickness of a thin layer of material such as silicon oxide is difficult to realize.

As described above, there is a case where a diffraction grating for producing sub-beams used for tracking-servo control is placed between the light source 1 and the collimator lens 3. In this case, each of the optical surfaces 31 and 32 of the collimator lens 3 and the surface D (42) of the objective lens 4 is exposed to the strong diffracted light having the intensity distribution in a stripe pattern caused by the diffraction grating. Therefore, change in shape of a stripe pattern tends to occur on each of the optical surfaces 31 and 32 of the collimator lens 3 and the surface D (42) of the objective lens 4. Furthermore, the laser beam incident on the surface C (41) of the objective lens 4 is converged by the refractive power of the surface C (41), and then is incident on the surface D (42) in a state where the power density of the laser beam on the surface D (42) is five times as large as the power density of the laser beam on the surface C (41). Therefore, regarding the surface D (42), the change in shape tends to occur in the entire region of the surface D (42) through which the laser beam passes. For this reason, a functional film having a particularly high light-resisting property is provided on each of the optical surfaces 31 and 32 of the collimator lens 3 and the surface D (42) of the objective lens 4.

The functional film formed on each of the optical surfaces 31 and 32 of the collimator lens 4 and the surface D (42) of the objective lens 3 is a multilayer of dielectric films, and is formed on the optical surface, for example, by sputtering or vacuum deposition. As a material of the functional film formed on these optical surfaces, silicon oxide, aluminum oxide, aluminum fluoride, magnesium fluoride or a mixture of at least two of the these materials is used, and a material containing elements, such as titanium, tantalum, hafnium, zirconium, niobium, molybdenum or chromium which compose a compound having the photocatalysis is not used. It should be noted that the functional films formed on the optical surfaces 31 and 32 and the surface D (42) of the objective lens 4 may have the same structure or may have different structures.

Since the surface C (41) of the objective lens 4 has a large curvature, the surface C (41) of the objective lens 4 is obliquely oriented with respect to the incident laser beam, and therefore the substantial power density of the laser beam on the surface C (41) becomes low. For this reason, the maximum value of the power density of the laser beam to which the surface C (41) of the objective lens 4 is exposed is considerably lower than the power densities of the laser beam on the surface A (31), the surface B (32) and the surface D (42).

Furthermore, since the material of the functional film formed on the optical surfaces including the surface A (31) has a relatively low refractive index which is lower than or equal to 1.7, the adjustable range of reflectivity is limited. It is difficult to achieve the optical performance for not decreasing the rim intensity with such a functional film. For this reason, the functional film on the surface C (41) of the objective lens 4 is configured to have the high refractive index material containing the transition material, such as tantalum, so that the optical performance not decreasing the rim intensity can be achieved, and is configured to have a film structure for securing a constant degree of light-resisting property while protecting the base material against the effect by the compound containing the transition material such as tantalum. Specifically, the bottom layer (closest to the base material) of the functional film is made of silicon oxide, aluminum oxide, aluminum fluoride, magnesium fluoride or a mixture of at least two of the these materials (e.g., a mixture of silicon oxide and aluminum oxide) which has only a slight effect on the light-resisting property of the optical surface, and the high refractive index layer made of the composition containing tantalum, hafnium, zirconium, niobium, molybdenum or chromium is arranged not to directly contact the base material. Furthermore, in order to prevent more securely decrease of the light-resisting property by the high refractive index layer containing the transition element such as tantalum, two or more layers, each of which is made of the material such as silicon oxide which has only a slight effect on the light-resisting property, are arranged between the base material and the high refractive index layer, and consequently the functional film formed of at least four layers in total is provided. By providing two or more layers made of the material such as silicon oxide between the base material and the high refractive index layer, it becomes possible to secure an adequate distance between the base material and the layer containing the transition metal. Furthermore, by forming the functional film as a multilayer film having four or more dielectric layers, it becomes possible to give the optical performance required for improving the rim intensity to the functional film. It should be noted that the material containing titanium which decreases the light-resisting property remarkably is not used as material of the functional film for the surface C (41).

Since the surface C (41) of the objective lens 4 is a curved surface having a large curvature, light rays in the periphery part of the laser beam enter the surface C (41) at large incident angles. In general, a functional film formed on an optical surface is configured such that the optical performance is optimized for a light ray passing along an optical axis of the optical surface. That is, in general, an antireflection film formed on an incident surface of an objective lens is configured such that the reflectivity becomes small and the laser beam passes the incident surface with a low degree of loss of light when the laser beam having a design wavelength enters the incident surface perpendicularly. Since the optical performance of the functional film, such as a multilayer film of dielectric layers, changes depending on the incident angle of the laser beam incident on the functional film, the functional film configured as described above shows a high reflectivity and a larger degree of loss of light with respect to the laser beam having a large incident angle.

Since a light ray in the center of the laser beam enters the surface C at a small incident angle, the transmission loss of light becomes small. On the other hand, since a light ray in the periphery of the laser beam enters the surface C at a large incident angle, the transmission loss of light becomes large. In this case, the rim intensity (the power intensity in the peripheral part of the laser beam) of the laser beam decreases. If the rim intensity decreases and thereby the intensity distribution of the laser beam shifts from a Gaussian curve, the beam west diameter becomes large. According to the embodiment of the invention, to prevent increase of the beam west due to decrease of the rim intensity, the functional film on the surface C (41) is configured such that the wavelength $\lambda_{min}$ (e.g., 600 nm to 750 nm) at which the reflectivity takes a minimum value at vertical incidence (a state of the laser beam being perpendicularly incident on an optical surface) is longer than the design wavelength. By providing the functional film configured as described above on the surface C (41), it becomes possible to suppress the reflectivity of the functional film with respect to a light ray in the peripheral part of the laser beam passing through the surface C (41), and thereby it becomes possible to improve the rim intensity. As a result, the laser beam can be converged to have a small beam west diameter like a Gaussian beam, and therefore the jitter can be suppressed.

In this embodiment, the functional film on the surface C (41) is configured such that the wavelength $\lambda_{max}$ at which the reflectivity takes a maximum value at vertical incidence falls within a wavelength range of 350 nm to 450 nm. In addition, the functional film on the surface C (41) is configured such that the wavelength $\lambda_{min}$ at which the reflectivity takes a minimum value at vertical incidence falls within a range of 600 nm to 750 nm. By thus shifting the wavelength at which the reflectivity takes a minimum vale to the longer wavelength side relative to the wavelength of the laser beam, the rim intensity can be improved. Furthermore, the functional film on the surface C (41) is configured such that the reflectivity for vertical incidence light decreases monotonously from $\lambda_{max}$ to $\lambda_{min}$. $\lambda_{max}$ and $\lambda_{min}$ respectively correspond to the wavelength at which the reflectivity takes the minimum value and the maximum value within the wavelength range of 300 to 800 nm. By defining the reflectivity spectrum of the functional film such that the reflectivity spectrum is smooth within the use wavelength range and that the waveform of the reflectivity spectrum has no extreme value, it becomes possible to prevent the functional film from giving a strong degree of modulation to the intensity distribution of light passing through or reflecting from the functional film. It should be noted that the reflectivity spectrum waveform in a longer wavelength region close to 800 nm has an effect on reflection of a light ray in the peripheral part of the laser beam which is incident on the surface C (41) at a large incident angle.

Hereafter, eleven concrete examples according to the embodiment of the invention are described. Table 1 shows eleven configurations of first to eleventh examples of the optical system of an optical pick-up 100. Table 2 shows structures of functional films F1 to F12 used in the first to eleventh examples.

TABLE 1

| | | $1^{st}$ Example | $2^{nd}$ Example | $3^{rd}$ Example | $4^{th}$ Example | $5^{th}$ Example |
|---|---|---|---|---|---|---|
| Collimator | Surface A | F12 | F12 | F12 | F12 | F12 |
| Lens | Surface B | F12 | F12 | F12 | F12 | F12 |
| | Tg | 121° C. | 121° C. | 121° C. | 121° C. | 121° C. |
| Objective | Surface C | Fl | F2 | F3 | F4 | F5 |
| Lens | Sueface D | F11 | F11 | F11 | F12 | F11 |
| | Tg | 121° C. | 135° C. | 121° C. | 121° C. | 156° C. |
| λmax (Surface C) | | 415 nm | 395 nm | 405 nm | 390 nm | 405 nm |
| λmin (Surface C) | | 695 nm | 640 nm | 685 nm | 625 nm | 685 nm |
| Spot Property (O: suitable) | | O | O | O | O | O |

TABLE 1-continued

| | | 6th Example | 7th Example | 8th Example | 9th Example | 10th Example |
|---|---|---|---|---|---|---|
| Collimator | Surface A | F12 | F12 | F12 | F12 | F12 |
| Lens | Surface B | F12 | F12 | F12 | F12 | F12 |
| | Tg | 121° C. | 121° C. | 121° C. | 135° C. | 135° C. |
| Objective | Surface C | F6 | F7 | F8 | F9 | F10 |
| Lens | Sueface D | F11 | F11 | F11 | F11 | F12 |
| | Tg | 124° C. | 121° C. | 135° C. | 121° C. | 121° C. |
| λmax (Surface C) | | 420 nm | 375 nm | 375 nm | 405 nm | 400 nm |
| λmin (Surface C) | | 690 nm | 610 nm | 645 nm | 660 nm | 670 nm |
| Spot Property (O: suitable) | | O | O | O | O | O |

TABLE 2

| Layer No. | | Fl | F2 | F3 | F4 |
|---|---|---|---|---|---|
| 1st Layer | Material | Silicon Oxide | Silicon Oxide | Silicon Oxide | Silicon Oxide + Aluminum Oxide |
| | n1 | 1.46 | 1.46 | 1.46 | 1.49 |
| | d1 | 34 nm | 51 nm | 14 nm | 94 nm |
| 2nd Layer | Material | Aluminum Oxide | Aluminum Oxide | Aluminum Oxide | Aluminum Oxide |
| | n2 | 1.64 | 1.64 | 1.64 | 1.64 |
| | d2 | 34 nm | 38 nm | 23 nm | 23 nm |
| 3rd Layer | Material | Tantalum Oxide | Tantalum Oxide | Tantalum Oxide | Tantalum Oxide |
| | n3 | 1.94 | 1.94 | 1.94 | 1.94 |
| | d3 | 55 nm | 55 nm | 60 nm | 69 nm |
| 4th Layer | Material | Silicon Oxide | Silicon Oxide | Silicon Oxide + Aluminum Oxide | Silicon Oxide |
| | n4 | 1.46 | 1.46 | 1.49 | 1.46 |
| | d4 | 130 nm | 114 nm | 125 nm | 107 nm |
| λmax | | 415 nm | 395 nm | 405 nm | 390 nm |
| λmin | | 695 nm | 640 nm | 685 nm | 625 nm |

| Layer No. | | F5 | F6 | F7 | F8 |
|---|---|---|---|---|---|
| 1st Layer | Material | Silicon Oxide + Aluminum Oxide | Silicon Oxide | Silicon Oxide | Silicon Oxide |
| | n1 | 1.49 | 1.46 | 1.46 | 1.46 |
| | d1 | 51 nm | 60 nm | 69 nm | 43 nm |
| 2nd Layer | Material | Aluminum Oxide | Aluminum Oxide | Aluminum Oxide | Aluminum Oxide |
| | n2 | 1.64 | 1.64 | 1.64 | 1.64 |
| | d2 | 23 nm | 31 nm | 53 nm | 76 nm |
| 3rd Layer | Material | Tantalum Oxide | Tantalum Oxide | Silicon Oxide | Silicon Oxide |
| | n3 | 1.94 | 1.94 | 1.46 | 1.46 |
| | d3 | 43 nm | 60 nm | 96 nm | 60 nm |
| 4th Layer | Material | Silicon Oxide | Silicon Oxide + Aluminum Oxide | Aluminum Oxide | Aluminum Oxide |
| | n4 | 1.46 | 1.49 | 1.64 | 1.64 |
| | d4 | 133 nm | 125 nm | 31 nm | 53 nm |
| λmax | | 405 nm | 420 nm | 375 nm | 375 nm |
| λmin | | 685 nm | 690 nm | 610 nm | 645 nm |

| Layer No. | | F9 | F10 | Fl1 | F12 |
|---|---|---|---|---|---|
| 1st Layer | Material | Silicon Oxide | Silicon Oxide | Silicon Oxide | Silicon Oxide |
| | n1 | 1.46 | 1.46 | 1.46 | 1.46 |
| | d1 | 103 nm | 69 nm | 79 nm | 69 nm |
| 2nd Layer | Material | Aluminum Oxide | Aluminum Oxide | Aluminum Oxide | Aluminum Oxide |
| | n2 | 1.64 | 1.64 | 1.64 | 1.64 |
| | d2 | 53 nm | 62 nm | 70 nm | 62 nm |
| 3rd Layer | Material | Silicon | Silicon | Silicon | Silicon |

TABLE 2-continued

| | | | | | |
|---|---|---|---|---|---|
| | | Oxide | Oxide | Oxide | Oxide |
| | n3 | 1.46 | 1.46 | 1.46 | 1.46 |
| | d3 | 74 nm | 69 nm | 79 nm | 69 nm |
| 4th Layer | Material | Aluminum Oxide | Aluminum Oxide | | |
| | n4 | 1.64 | 1.64 | | |
| | d4 | 58 nm | 62 nm | | |
| λmax | | 405 nm | 400 nm | — | — |
| λmin | | 660 nm | 670 nm | 460 nm | 405 nm |

Figure 3A:
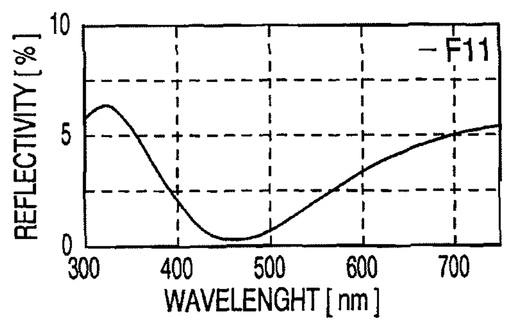
FIGS. 3A and 3B are graphs respectively illustrating the reflection spectrums of functional films F11 and F12 according to the embodiment.
Figure 3B:
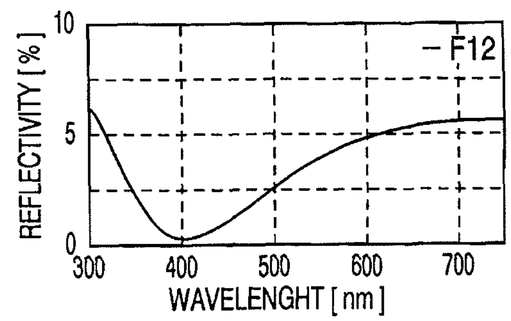

FIGS. 2A to 2J are graphs respectively illustrating the reflection spectrums of the functional films F1 to F10 formed on the surface C (41). FIGS. 3A and 3B are graphs respectively illustrating the reflection spectrums of the functional films F11 and F12 formed on the surfaces A, B and D. Each of FIGS. 2A-2J and 3A-3B shows the reflection spectrum defined when a light ray perpendicularly enters the optical surface of each optical element.

In Table 1, the glass transition temperatures Tg and the structures of the functional films F1 to F12 formed on each of the optical surfaces of the collimator lens 3 and the objective lens 4, the wavelength λmax at which the reflectivity of the surface C (41) takes a maximum value, the wavelength λmin at which the reflectivity of the surface C (41) takes a minimum value, and the evaluation (good or bad) of the spot property obtained after the light-resisting property evaluation test are shown.

In Table 2, the structure of the functional film (the material of each layer, the refractive indexes n1-n4, and the thicknesses d1-d4 (unit: nm)), $\lambda_{max}$ and $\lambda_{min}$ are shown for each of the functional films F1 to F12.

The base material of each example is resin material which has excellent thermal shape stability and has the glass transition temperature Tg higher than or equal to 121° C. That is, the material which is hard to cause the change in shape on the optical surface is selected as the base material. In particular, in the fifth example, the base material of the objective lens has the glass transition temperature Tg of 156° C., and therefore a large amount of enhance of the light-resisting property can be achieved by the base material alone.

Each of the functional films F1 to F10 formed on the surface C (41) is a dielectric multilayer film having a four layer structure. Each of the functional films F11 and F12 formed on the surfaces A, B and D is a dielectric multilayer film having a three layer structure. In the dielectric multilayer film, a layer closest to the base material is defined as the first layer, and the second, third and fourth layers are stacked in this order on the first layer.

The functional film (multilayer film) on the optical surface of each example is basically formed of the low refractive index layer (e.g., $n<1.55$) and the intermediate refractive index layer (e.g., $1.55\leq n<1.70$). The functional film formed on the optical surface C (41) is additionally provided with the high refractive index layer having a further higher refractive index (e.g., $1.70<n$). Each of the low refractive index layer and the intermediate refractive index layer is made of silicon oxide, aluminum oxide, aluminum fluoride, magnesium fluoride or a mixture of at least two of the these materials. As shown in Table 2, in the examples, the low refractive index layer is made principally of silicon oxide (the refractive index of 1.46). Parts of the functional films (F3-F6) have the low refractive index layer made of material (the refractive index of 1.49) made by mixing a small amount of aluminum oxide into silicon oxide so that the refractive index is increased slightly. In each of the examples, the intermediate refractive index layer (the refractive index 1.64) is made of aluminum oxide.

Each of the low refractive index layer and the intermediate refractive index layer does not contain titanium, tantalum, hafnium, zirconium, niobium, molybdenum nor chromium. The high refractive index layer is made of a compound (e.g., an oxide) containing a transition element, such as tantalum, hafnium, zirconium, niobium, molybdenum or chromium or a mixture of at least two of these elements. However, in this case, a compound containing titanium such as titanium oxide is excluded from the material for the high refractive index layer. That is, according to the embodiment of the invention, none of the functional films formed on the optical surfaces of the collimator lens 3 and the objective lens 4 includes a composition containing titanium. In each of the examples, as material of the high refractive index layer of each of the functional films F1 to F6, tantalum oxide (the refractive index of 1.94) is used.

The functional films F11 and F12 provided on the surface A (31), the surface B (32) and the surface D (42) will now be explained. As described above, in this embodiment, each of the optical surfaces A (31) and B (32) of the collimator lens 3 and the surface D (42) of the objective lens 4 is provided with the three layer functional film having the following structure. In the following table, d1 to d3 represent the thicknesses (unit: nm) of the first to third layers, respectively.

First Layer: Low Refractive Index Layer ($40 \leq d1 \leq 100$)

Second Layer: Intermediate Refractive Index Layer ($40 \leq d2 \leq 150$)

Third Layer: Low Refractive Index Layer ($40 \leq d3 \leq 100$)

On each of the surface A (31), the surface B (32) and the surface D (42) according to each of the examples, the functional film configured as described above is formed. The above described three layer film is made of silicon oxide, aluminum oxide, aluminum fluoride, magnesium fluoride or a mixture (e.g., a mixture of silicon oxide and aluminum oxide) of at least two of the these materials which do not affect the light-resisting property of each optical surface. Since the transition element, such as titanium, tantalum, hafnium, zirconium, niobium, molybdenum or chromium, is not used as material of the three layer film, a coated surface having an excellent light-resisting property can be achieved. As shown in FIGS. 3A and 3B, each of the functional films F11 and F12 shows a low reflectivity around the design wavelength (406 nm) at vertical incidence, which is advantageous in securing an adequate light amount.

Hereafter, the layer structures of the functional films F1 to F10 provided on the surface C (41) will be explained. As described above, the four layer functional film is formed on the surface C (41) of each example. Each of the functional films F1 to F6 employs a following layer structure. In the following table, d1 to d4 represent the thicknesses of the first to fourth layers (unit: nm), respectively.

First Layer: Low Refractive Index Layer ($10 \leq d1 \leq 100$)

Second Layer: Intermediate Refractive Index Layer ($20 \leq d2 \leq 50$)

Third Layer: High Refractive Index Layer ($40 \leq d3 \leq 100$)

Fourth Layer: Low Refractive Index Layer ($100 \leq d4 \leq 200$)

It is preferable that first layer is not the high refractive index layer, and that the high refractive index layer is provided on a layer higher than or equal to the third layer. In each example, the high refractive index layer is provided on the third layer. Furthermore, by providing a plurality of layers not containing the transition element between the base material and the high refractive index layer, it becomes possible to secure an adequate interval between the base material and the high refractive index layer. It is preferable that the interval between the base material and the high refractive index layer (i.e., a sum of the thickness of the low refractive index layer and/or the thickness of the intermediate refractive index layer) falls within a range of 30 to 150 nm. By providing a certain interval between the base material and the high refractive index layer, the base material becomes hard to undergo a chemical effect directly from the high refractive index layer. As a result, the light-resisting property of the optical surface can be enhanced.

Each of the functional films F7 to F10 not provided with the high refractive index layer employs the following layer structure. In the following table, d1 to d4 respectively represents the thicknesses of the first to fourth layers (unit: nm).

First Layer: Low Refractive Index Layer ($20 \leq d1 \leq 150$)

Second Layer: Intermediate Refractive Index Layer ($30 \leq d2 \leq 100$)

Third Layer: Low Refractive Index Layer ($30 \leq d3 \leq 100$)

Fourth Layer: Intermediate Refractive Index Layer ($30 \leq d4 \leq 100$)

By employing the four layer structure, it becomes possible to provide desired optical performance for each functional film. Furthermore, by setting the thicknesses of the layers within the above described ranges, the rim intensity can be enhanced. Therefore, the laser beam can be converged to have the small beam west diameter similar to a Gaussian beam, and therefore the jitter can be suppressed. By providing the surface C (41) with the reflecting property that the reflectivity becomes lager than or equal to 10% at vertical incidence within the wavelength range of 350 nm to 400 nm, it becomes possible to appropriately suppress decreasing of the rim intensity.

Table 1 shows the wavelength $\lambda_{max}$ at which the reflectivity spectrum takes a maximum value and the wavelength $\lambda_{min}$ at which the reflectivity spectrum takes a minimum vale. Each of the functional films F11 and F12 provided on each of the surfaces A, B and D is adjusted such that the wavelength $\lambda_{min}$ at which the reflectivity spectrum takes a minimum value is positioned around the design reference wavelength (406 nm). The functional film F12 is desirable relative to the functional film F11 because, at the design wavelength, the reflectivity of the functional film F12 is lower than that of the functional film 11. Regarding the functional films F1 to F10 provided on the surface C (41) which has the large curvature, parameters of each functional film is set such that the wavelength $\lambda_{min}$ at which the reflectivity spectrum takes a minimum value falls within the range of 600 nm to 750 nm and the wavelength $\lambda_{max}$ at which the reflectivity spectrum takes a maximum value falls within the range of 350 nm to 450 nm. By providing the functional film with the wavelength property that the wavelength corresponding to the minimum reflectivity shifts toward the longer wavelength side with respect to the wavelength of the laser beam, the substantially uniform reflectivity can be given to the entire laser beam. Therefore, it becomes possible to form the slim beam west on the recording surface of the optical disc D0. As shown in Table 1, in each of the examples, a suitable beam spot property can be achieved. Therefore, the jitter can be suppressed.

Although the present invention has been described in considerable detail with reference to certain preferred embodiments thereof, other embodiments are possible.

It should be noted that various parameters shown in Table 1 are provided by way of example. It is understood that various types of glass transition temperatures, the layer structures of the functional film, the materials (refractive indexes) and the thicknesses of layers of the functional film not shown in Table 1 can be employed.

Figure 4:
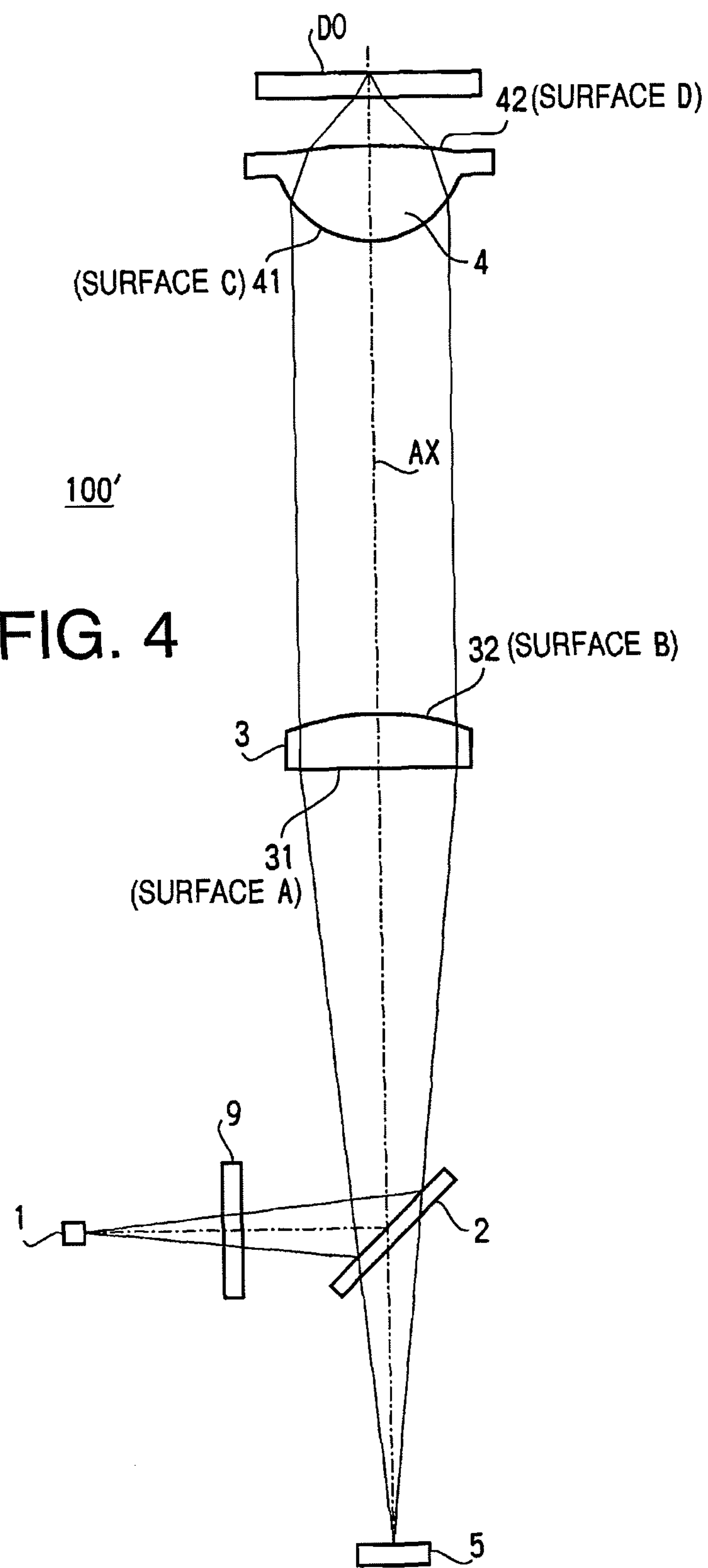
FIG. 4 shows an example of a configuration of an optical system of an optical pick-up where a diffraction grating is placed between a light source and a collimator lens.

FIG. 4 shows an example of a configuration of an optical system of an optical pick-up 100' where a diffraction grating 9 is placed between the light source 1 and the collimator lens 3.

This application claims priority of Japanese Patent Applications No. P2009-225781, filed on Sep. 30, 2009, and No. P2010-169909, filed on Jul. 29, 2010. The entire subject matter of the applications is incorporated herein by reference.

What is claimed is:

1. An optical information recording/reproducing optical system for recording information to and/or reproducing information from an optical disc by a laser beam impinging on a recording layer of the optical disc, comprising:

a light source that emits the laser beam;

an optical element that converts the laser beam emitted by the light source into a substantially collimated beam; and an objective lens that converges the laser beam emerging from the optical element onto the recording layer of the optical disc, wherein:

a wavelength λ (unit: nm) of the laser beam falls within a range defined by a following condition:

$$390<\lambda<420$$

the optical element and the objective lens comprise same or different resin materials having a glass transition temperature Tg satisfying a condition:

$$Tg>115^\circ\ C.$$

a first multilayer functional film, a second multilayer functional film and a third multilayer functional film are provided on an optical disc side optical surface of the objective lens, a light source side optical surface of the optical element, and an optical disc side optical surface of the optical element, respectively;

a light source side optical surface of the objective lens opposite to the optical disc side optical surface of the objective lens is provided with a fourth multilayer functional film having four or more layers;

the fourth multilayer functional film does not contain titanium (Ti);

each of the first, second and third multilayer functional films includes a non-high refractive index layer comprising a composition containing one of silicon oxide, aluminum oxide, aluminum fluoride and magnesium fluoride or a mixture of at least two of silicon oxide, aluminum oxide, aluminum fluoride and magnesium fluoride;

each of the first, second and third multilayer films does not have a layer containing a composition comprising at least one of elements titanium (Ti), tantalum (Ta), hafnium (Hf), zirconium (Zr), niobium (Nb), molybdenum (Mo) and chromium (Cr), a layer of the fourth multilayer functional film closest to a base material comprises the non-high refractive index layer;

the fourth multilayer functional film is configured such that a wavelength $\lambda_{max(2)}$ at which reflectivity at vertical incidence of the fourth multilayer film has a maximum value and a wavelength $\lambda_{min(2)}$ at which reflectivity at vertical incidence of the fourth multilayer film has a minimum value respectively satisfy the following conditions:

$$350<\lambda_{max(2)}<420$$

$$600<\lambda_{min(2)}<750;\ \text{and}$$

the fourth multilayer functional film is configured such that the reflectivity of the fourth multilayer functional film at vertical incidence decreases monotonously from the wavelength $\lambda_{max(2)}$ to the wavelength $\lambda_{min(2)}$.

2. The optical information recording/reproducing optical system according to claim 1, wherein the fourth multilayer film includes a high refractive index layer containing a composition comprising at least one of tantalum (Ta), hafnium (Hf), zirconium (Zr), niobium (Nb), molybdenum (Mo) and chromium (Cr) or a mixture of at least two of the tantalum (Ta), hafnium (Hf), zirconium (Zr), niobium (Nb), molybdenum (Mo) and chromium (Cr).

3. The optical information recording/reproducing optical system according to claim 1, wherein the reflectivity at vertical incidence of the first multilayer film on the optical disc side surface of the objective lens has a value larger than or equal to 10% within a wavelength range of 350 to 450 nm.

4. The optical information recording/reproducing optical system according to claim 1, further comprising a diffraction grating which divides the laser beam from the light source into a plurality of diffracted light beams, the diffraction grating being located between the light source and the optical element.

5. The optical information recording/reproducing optical system according to claim 1, wherein the first multilayer film on the optical disc side surface of the objective lens is configured such that a wavelength $\lambda_{min(1)}$ at which reflectivity at vertical incidence of the first multilayer film has a minimum value satisfies a condition:

$$430<\lambda_{min(1)}<600.$$

6. The optical information recording/reproducing optical system according to claim 1, wherein:

the first multilayer film is a three layer film comprising a base material, first to third layers positioned in this order from a base material side; and when n1 to n3 respectively represent refractive indexes of the first to third layers at a wavelength of 406 nm and d1 to d3 (unit: nm) respectively represent thicknesses of the first to third layers, the refractive indexes n1 to n3 and the thicknesses d1 to d3 satisfy the conditions:

First Layer: $n1\le1.55$, $40\le d1\le100$

Second Layer: $1.55<n2\le1.70$, $40\le d2\le150$

Third Layer: $n3\le1.55$, $40\le d3\le100$.

7. The optical information recording/reproducing optical system according to claim 1, wherein:

the fourth multilayer film is a four layer film comprising the base material, fourth to seventh layers positioned in this order from a base material side; and when n4 to n7 respectively represent refractive indexes of the fourth to seventh layers at a wavelength of 406 nm and d4 to d7 (unit: nm) respectively represent thicknesses of the fourth to seventh layers, the refractive indexes n4 to n7 and the thicknesses d4 to d7 satisfy the conditions:

Fourth Layer: $n4\le1.55$, $10\le d4\le100$

Fifth Layer: $1.55<n5\le1.70$, $20\le d5\le50$

Sixth Layer: $1.80\le n6$, $40\le d6\le100$

Seventh Layer $n7\le1.55$, $100\le d7\le200$.

8. The optical information recording/reproducing optical system according to claim 1, wherein:

the fourth multilayer film is a four layer film comprising the base material, fourth to seventh layers positioned in this order from a base material side; and when n4 to n7 respectively represent refractive indexes of the fourth to seventh layers at a wavelength of 406 nm and d4 to d7 (unit: nm) respectively represent thicknesses of the fourth to seventh layers, the refractive indexes n4 to n7 and the thicknesses d4 to d7 satisfy the conditions:

Fourth Layer: $n4 \leq 1.55$, $20 \leq d4 \leq 150$

Fifth Layer: $1.55 < n5 \leq 1.70$, $30 \leq d5 \leq 100$

Sixth Layer: $n6 \leq 1.55$, $30 \leq d6 \leq 100$

Seventh Layer $1.55 < n7 \leq 1.70$, $30 \leq d7 \leq 100$.

9. An optical information recording/reproducing apparatus for recording information to and/or reproducing information from an optical disc by a laser beam impinging on a recording layer of the optical disc, comprising an optical information recording/reproducing optical system, the optical information recording/reproducing optical system including:

a light source that emits the laser beam;

an optical element that converts the laser beam emitted by the light source into a substantially collimated beam;

an objective lens that converges the laser beam emerging from the optical element onto the recording layer of the optical disc; and a photoreceptor that receives light from the optical disc and performs photoelectric conversion;

wherein:

a wavelength λ (unit: nm) of the laser beam falls within a range defined by a following condition:

$$390 < \lambda < 420;$$

the optical element and the objective lens comprise same or different resin materials having a glass transition temperature Tg satisfying a condition:

$$Tg > 115° \text{ C.};$$

a first multilayer functional film, a second multilayer functional film and a third multilayer functional film are provided on an optical disc side optical surface of the objective lens, a light source side optical surface of the optical element, and an optical disc side optical surface of the optical element, respectively;

a light source side optical surface of the objective lens opposite to the optical disc side optical surface of the objective lens is provided with a fourth multilayer functional film having four or more layers;

the fourth multilayer functional film does not contain titanium (Ti);

each of the first, second and third multilayer functional films includes a non-high refractive index layer comprising a composition containing one of silicon oxide, aluminum oxide, aluminum fluoride and magnesium fluoride or a mixture of at least two of silicon oxide, aluminum oxide, aluminum fluoride and magnesium fluoride;

each of the first, second and third multilayer films does not have a layer containing a composition comprising at least one of elements titanium (Ti), tantalum (Ta), hafnium (Hf), zirconium (Zr), niobium (Nb), molybdenum (Mo) and chromium (Cr), a layer of the fourth multilayer functional film closest to a base material comprises the non-high refractive index layer;

the fourth multilayer functional film is configured such that a wavelength $\lambda_{max(2)}$ at which reflectivity at vertical incidence of the fourth multilayer film has a maximum value and a wavelength $\lambda_{min(2)}$ at which reflectivity at vertical incidence of the fourth multilayer film has a minimum value respectively satisfy the following conditions:

$$350 < \lambda_{max(2)} < 420$$

$$600 < \lambda_{min(2)} < 750; \text{ and}$$

the fourth multilayer functional film is configured such that the reflectivity of the fourth multilayer functional film at vertical incidence decreases monotonously from the wavelength $\lambda_{max(2)}$ to the wavelength $\lambda_{min(2)}$.

10. The optical information recording/reproducing apparatus according to claim 9, wherein the fourth multilayer film includes a high refractive index layer containing a composition comprising at least one of tantalum (Ta), hafnium (Hf), zirconium (Zr), niobium (Nb), molybdenum (Mo) and chromium (Cr) or a mixture of at least two of the tantalum (Ta), hafnium (Hf), zirconium (Zr), niobium (Nb), molybdenum (Mo) and chromium (Cr).

11. The optical information recording/reproducing apparatus according to claim 9, wherein the reflectivity at vertical incidence of the first multilayer film on the optical disc side surface of the objective lens has a value larger than or equal to 10% within a wavelength range of 350 to 450 nm.

12. The optical information recording/reproducing apparatus according to claim 9, wherein the optical information recording/reproducing optical system further includes a diffraction grating which divides the laser beam from the light source into a plurality of diffracted light beams, the diffraction grating being located between the light source and the optical element.

13. The optical information recording/reproducing apparatus according to claim 9, wherein the first multilayer film on the optical disc side surface of the objective lens is configured such that a wavelength $\lambda_{min(1)}$ at which reflectivity at vertical incidence of the first multilayer film has a minimum value satisfies a condition:

$$430 < \lambda_{min(1)} < 600.$$

14. The optical information recording/reproducing apparatus according to claim 9, wherein:

the first multilayer film is a three layer film comprising a base material, first to third layers positioned in this order from a base material side; and when n1 to n3 respectively represent refractive indexes of the first to third layers at a wavelength of 406 nm and d1 to d3 (unit: nm) respectively represent thicknesses of the first to third layers, the refractive indexes n1 to n3 and the thicknesses d1 to d3 satisfy the conditions:

First Layer: $n1 \leq 1.55$, $40 \leq d1 \leq 100$

Second Layer: $1.55 < n2 \leq 1.70$, $40 \leq d2 \leq 150$

Third Layer: $n3 \leq 1.55$, $40 \leq d3 \leq 100$.

15. The optical information recording/reproducing apparatus according to claim 9, wherein:

the fourth multilayer film is a four layer film comprising the base material, fourth to seventh layers positioned in this order from a base material side; and when n4 to n7 respectively represent refractive indexes of the fourth to seventh layers at a wavelength of 406 nm and d4 to d7 (unit: nm) respectively represent thicknesses of the fourth to seventh layers, the refractive indexes n4 to n7 and the thicknesses d4 to d7 satisfy the conditions:

Fourth Layer: $n4 \leq 1.55$, $10 \leq d4 \leq 100$

Fifth Layer: $1.55 < n5 \leq 1.70$, $20 \leq d5 \leq 50$

Sixth Layer: $1.80 \leq n6$, $40 \leq d6 \leq 100$

Seventh Layer $n7 \leq 1.55$, $100 \leq d7 \leq 7200$.

16. The optical information recording/reproducing apparatus according to claim 9, wherein:

the fourth multilayer film is a four layer film comprising the base material, fourth to seventh layers provided in this order from a base material side; and when n4 to n7 respectively represent refractive indexes of the fourth to seventh layers at a wavelength of 406 nm and d4 to d7 (unit: nm) respectively represent thicknesses of the fourth to seventh layers, the refractive indexes n4 to n7 and the thicknesses d4 to d7 satisfy the conditions:

Fourth Layer: $n4 \leq 1.55$, $20 \leq d4 \leq 150$

Fifth Layer: $1.55 < n5 \leq 1.70$, $30 \leq d5 \leq 100$

Sixth Layer: $n6 \leq 1.55$, $30 \leq d6 \leq 100$

Seventh Layer $1.55 < n7 \leq 1.70$, $30 \leq d7 \leq 100$.

17. An objective lens that converges a laser beam from an optical element onto a recording layer of an optical disc, wherein a wavelength $\lambda$ (unit: nm) of the laser beam falls within a range $390 < \lambda < 420$, the optical element and the objective lens comprise same or different resin materials having a glass transition temperature Tg, such that Tg>115° C., multilayer functional films provided on a light source side surface and on an optical disc side surface of the optical element the objective lens comprising a first multilayer functional film, a second multilayer functional film and a third multilayer functional film are provided on an optical disc side optical surface of the objective lens, a light source side optical surface of the optical element, and an optical disc side optical surface of the optical element, respectively;

a light source side optical surface of the objective lens opposite to the optical disc side optical surface of the objective lens is provided with a fourth multilayer functional film having four or more layers;

the fourth multilayer functional film does not contain titanium (Ti);

each of the first, second and third multilayer functional films includes a non-high refractive index layer comprising a composition containing one of silicon oxide, aluminum oxide, aluminum fluoride and magnesium fluoride or a mixture of at least two of silicon oxide, aluminum oxide, aluminum fluoride and magnesium fluoride;

each of the first, second and third multilayer films does not have a layer containing a composition comprising at least one of elements, of titanium (Ti), tantalum (Ta), hafnium (Hf), zirconium (Zr), niobium (Nb), molybdenum (Mo) and chromium (Cr), a layer of the fourth multilayer functional film closest to a base material comprises the non-high refractive index layer;

the fourth multilayer functional film is configured such that a wavelength $\lambda_{max(2)}$ at which reflectivity at vertical incidence of the fourth multilayer film has a maximum value and a wavelength $\lambda_{min(2)}$ at which reflectivity at vertical incidence of the fourth multilayer film has a minimum value respectively satisfy following conditions:

$$600 < \lambda_{max(2)} < 420$$

$$600 < \lambda_{min(2)} < 750; \text{ and}$$

the fourth multilayer functional film is configured such that the reflectivity of the fourth multilayer functional film at vertical incidence decreases monotonously from the wavelength $\lambda_{max(2)}$ to the wavelength $\lambda_{min(2)}$.

18. The objective lens according to claim 17, wherein the fourth multilayer film includes a high refractive index layer containing a composition comprising at least one of tantalum (Ta), hafnium (Hf), zirconium (Zr), niobium (Nb), molybdenum (Mo) and chromium (Cr) or a mixture of at least two of tantalum (Ta), hafnium (Hf), zirconium (Zr), niobium (Nb), molybdenum (Mo) and chromium (Cr).

19. The objective lens according to claim 17, wherein the reflectivity at vertical incidence of the first multilayer film on the optical disc side surface of the objective lens has a value larger than or equal to 10% within a wavelength range of 350 to 450 nm.

20. The objective lens according to claim 17, wherein the first multilayer film on the optical disc side surface of the objective lens is configured such that a wavelength $\lambda_{min(1)}$ at which reflectivity at vertical incidence of the first multilayer film has a minimum value satisfies a condition:

$$430 < \lambda_{min(1)} < 600.$$

* * * * *